United States Patent [19]
Derrien et al.

[11] Patent Number: 5,219,152
[45] Date of Patent: Jun. 15, 1993

[54] ADJUSTABLE-STROKE SPRING AND SHOCK ABSORBER DEVICE

[75] Inventors: Michel Derrien, Versailles; Dominique Rouzaud, Angervilliers, both of France

[73] Assignee: Messier-Bugatti, Velizy-Villacoublay, France

[21] Appl. No.: 713,369

[22] Filed: Jun. 12, 1991

[30] Foreign Application Priority Data

Jun. 13, 1990 [FR] France ............................ 90 07336
Feb. 6, 1991 [FR] France ............................ 91 01318

[51] Int. Cl.⁵ .............................. F16F 9/19; F16F 9/44
[52] U.S. Cl. .............................. 267/64.15; 267/64.16; 267/64.19; 267/64.25; 267/118; 280/6.12; 280/43.23; 280/704; 280/714
[58] Field of Search ............... 267/64.15, 64.16, 64.19, 267/64.23, 64.25, 118, 285, 313, 314; 280/43.23, 6.12, 704, 714

[56] References Cited

U.S. PATENT DOCUMENTS

| | | | |
|---|---|---|---|
| 1,851,484 | 3/1932 | Bausman | 188/313 X |
| 2,554,581 | 5/1951 | Levy | 267/64.25 X |
| 3,945,664 | 3/1976 | Hiruma | |
| 4,291,850 | 6/1981 | Sharples | |
| 4,655,440 | 4/1987 | Eckert | 188/314 X |
| 4,773,672 | 9/1988 | Deroche | |
| 4,805,882 | 2/1989 | Veaux et al. | 267/64.25 |
| 4,886,248 | 12/1989 | Delhaye et al. | |

FOREIGN PATENT DOCUMENTS

| | | | |
|---|---|---|---|
| 0348286 | 12/1989 | European Pat. Off. | |
| 2362017 | 3/1978 | France | |
| 1243964 | 7/1986 | U.S.S.R. | 188/314 |
| 1412409 | 11/1975 | United Kingdom | 267/64.15 |

*Primary Examiner*—George A. Halvosa
*Attorney, Agent, or Firm*—Sixbey, Friedman, Leedom & Ferguson

[57] ABSTRACT

In the preferred embodiment, the device comprises a body, a sliding rod mounted to slide inside the body, and a control rod including both compression and expansion end-of-stroke abutments associated with a control piston for displacing the control rod to a position which is retracted or extended relative to the body. The stroke c of the sliding rod is greater than the distance d between the compression end-of-stroke abutment and an immediately adjacent end of the corresponding chamber when the control rod is in an extended position.

6 Claims, 4 Drawing Sheets

FIG_1

FIG_3

ADJUSTABLE-STROKE SPRING AND SHOCK ABSORBER DEVICE

The present invention relates to a variable-stroke spring and shock absorber device for a vehicle, in particular a self-propelled vehicle.

BACKGROUND OF THE INVENTION

When a vehicle, and in particular a self-propelled vehicle, is required to run over ground having different surface states, it is desirable to be able to adapt the characteristics of its suspension to the surface state of the ground. Similarly, when it is desired to adapt the vehicle to different types of driving, it is desirable to adapt the characteristics of its suspension to the desired type of driving. The spring and shock absorber device of the invention applies particularly, but not exclusively, to the suspension of a high performance motor car for driving both on the road and on a race track.

SUMMARY OF THE INVENTION

The present invention provides a spring and shock absorber device comprising a body, a sliding rod mounted to slide inside the body and to co-operate therewith to delimit a compression shock-absorbing chamber and an expansion shock-absorbing chamber both containing a shock-absorbing liquid and inter-connected by throttling means, the compression shock-absorbing chamber being connected by a connection duct to at least one accumulator containing a gas under pressure, and at least one sliding piston for displacing the control rod between positions which are retracted or extended relative to the body, wherein each control piston includes at least one end-of-stroke abutment constituted by a projecting shoulder and facing a corresponding abutment member of the sliding rod.

Thus, whenever each control piston is displaced, not only is the mean position of the sliding rod altered, but so is the stroke of the sliding rod because the shoulders constituting abutments for the sliding rod are displaced.

In one embodiment of the invention, the device includes two control pistons including respective end-of-stroke abutments projecting on opposite sides of a flange carried by the sliding rod.

In another embodiment of the invention, the control piston is associated with a control rod which is coaxial with the sliding rod and which includes a compression end-of-stroke abutment and an expansion end-of-stroke abutment, the stroke c of the control rod being greater than the distance d between the compression end-of-stroke abutment and an immediately adjacent end of the compression shock-absorbing chamber when the control rod is in an extended position.

Thus, when the control rod is moved from its extended position to its retracted position, the compression end-of-stroke abutment is retracted and the sliding rod comes into compression abutment against the end of the compression shock-absorbing chamber, whereas the expansion end-of-stroke abutment is displaced over a distance equal to the stroke of the control rod such that the stroke of the sliding rod is reduced. Simultaneously, retracting the control rod releases a volume in the compression shock absorbing chamber, which volume is compensated by retraction of the sliding rod, thereby varying the height of the vehicle above the ground.

In an advantageous version of the invention, the control piston has one face connected to the control rod associated with a retraction chamber for the control rod constantly connected to a source of fluid under pressure, and an opposite face associated with an extension chamber for the control rod connected to the same source of fluid under pressure via a feed line including a line cut-off member. Thus, in the event of certain control members failing, the spring and shock absorber device is automatically returned to the position which corresponds to maximum road-holding safety.

In an advantageous aspect of the invention, the body is connected to the two accumulators interconnected by the connection duct, and the connection duct includes means for isolating one of the accumulators from the compression shock absorbing chamber. Preferably, the means for isolating one of the accumulators from the compression shock absorbing chamber include a distributor valve controlled by the feed line to the chamber for extending the control rod. Thus, when the chamber for extending the control rod is fed to put the spring and shock absorber device into its road position, the second accumulator is automatically brought into operation, thereby reducing the stiffness of the device.

According to yet another advantageous aspect of the invention, the spring and shock absorber device includes a maximum lift member comprising a supply of hydraulic liquid connected to the compression shock absorbing chamber and a piston disposed in the supply to thrust the hydraulic liquid into the compression shock absorbing chamber. It is thus possible to raise the spring and shock absorber device at will, in particular for the purpose of passing slowly over an obstacle.

BRIEF DESCRIPTION OF THE DRAWINGS

Embodiments of the invention are described by way of example with reference to the accompanying drawings, in which.

DETAILED DESCRIPTION

Figure 1:
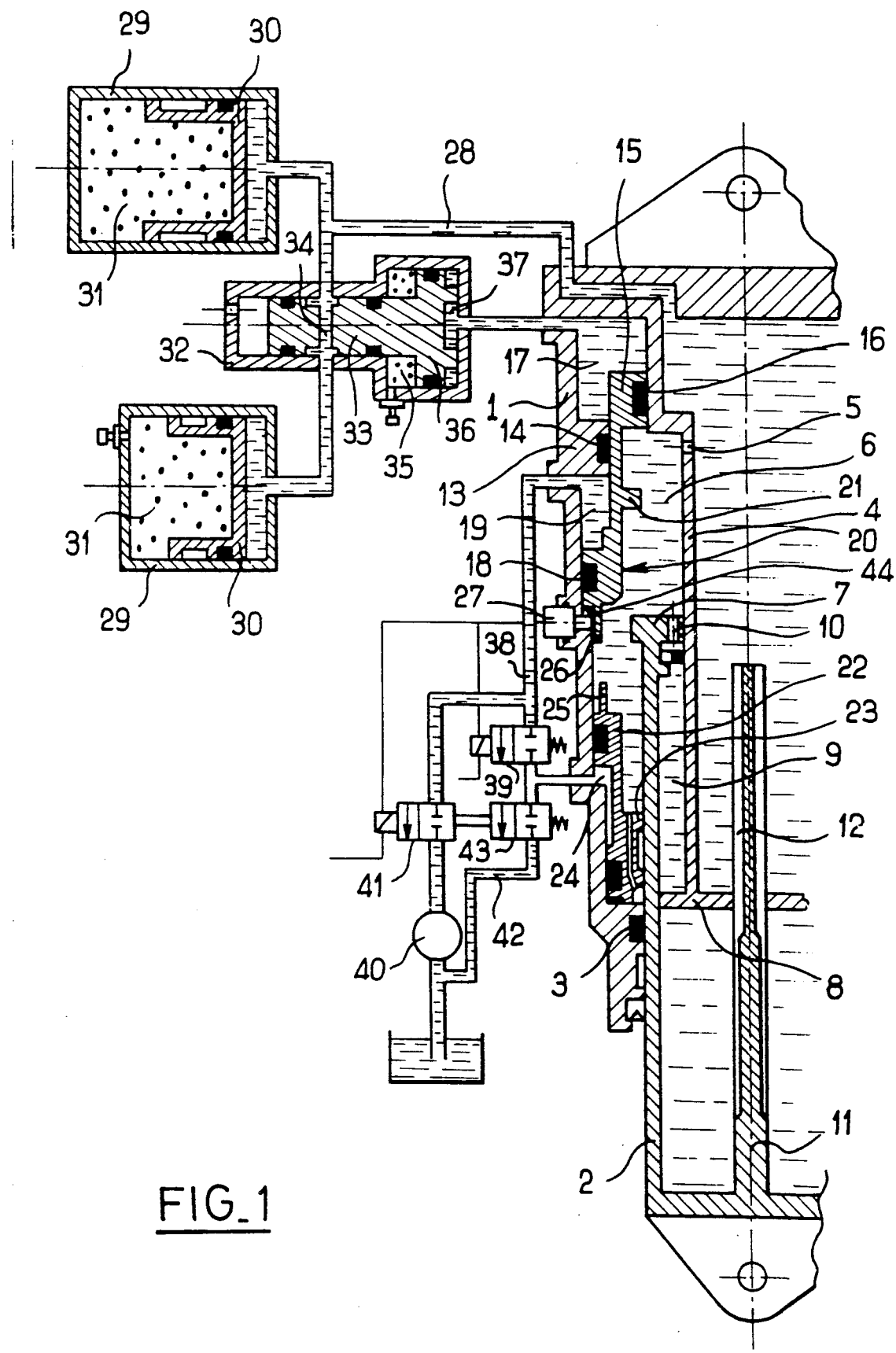
FIG. 1 is a fragmentary diagrammatic axial section view of a first embodiment of a spring and shock absorber device of the invention in a first in-use position.
Figure 2:
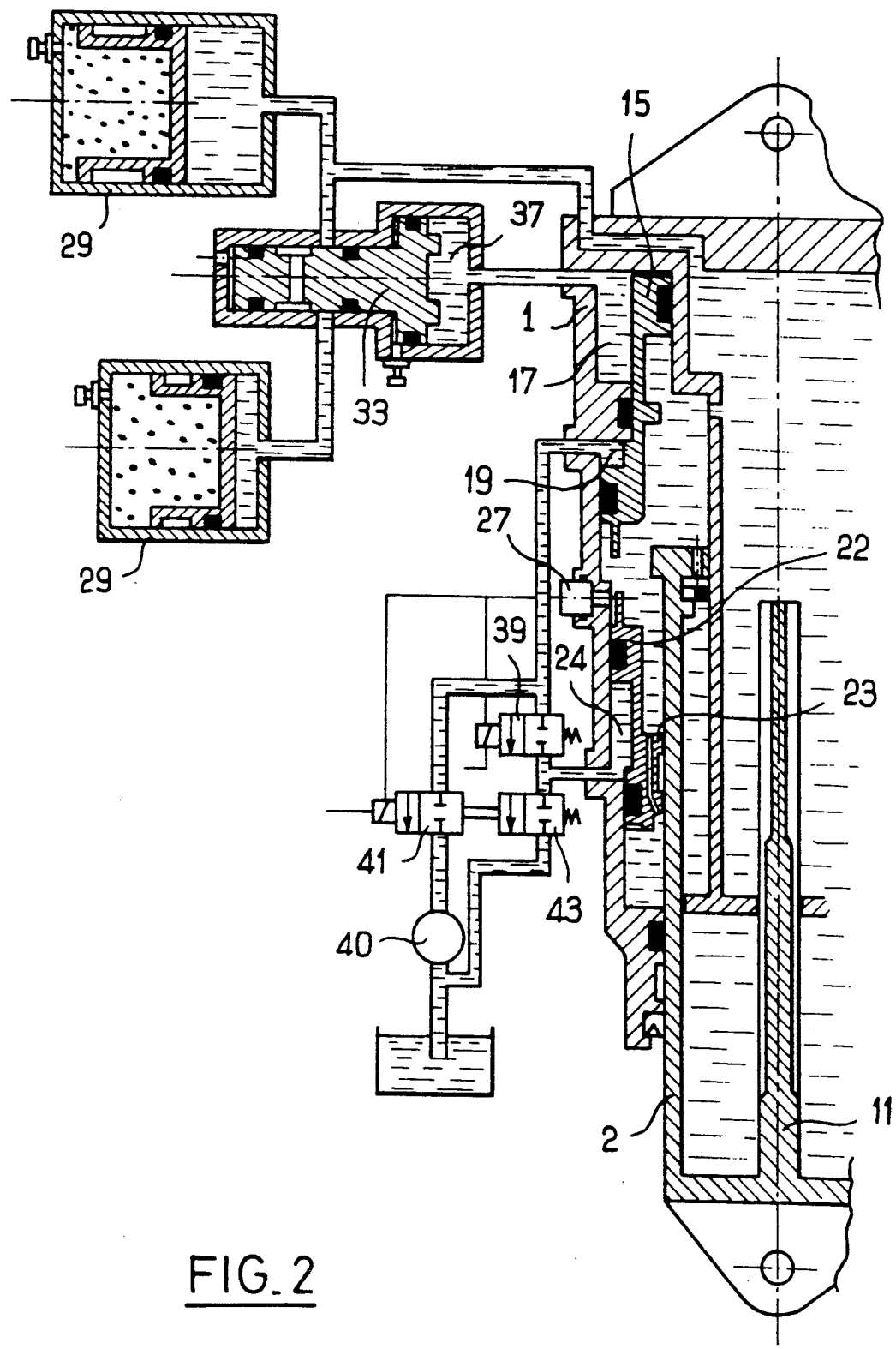
FIG. 2 is a view analogous to FIG. 1 but for a second in-use position.

With reference to FIGS. 1 and 2, the device of the invention comprises a body or strut 1 in which a sliding rod 2 is mounted to slide in leakproof manner by virtue of a sealing ring 3. A dip rod 4 is fixed inside the strut 1 and extends coaxially therewith. Close to its top end, the dip rod 4 includes a through orifice 5 providing communication between the inside of the dip rod 4 and an intermediate chamber 6 lying between the dip rod 4 and the strut 1. The sliding rod 2 includes a top flange 7 which slides over the outside surface of the dip rod 4. The bottom end of the dip rod 4 includes a transverse plate 8 extending to the inside surface of the sliding rod 2 and co-operating therewith and with the flange 7 to delimit an expansion throttling chamber 9 which is in communication with the intermediate chamber 6 via throttling non-return valves 10. A throttling rod 11 is fixed coaxially to the sliding rod 2 and extends through an opening in the bottom end of the dip rod 4. The throttling rod 11 includes throttling grooves 12 whose depth decreases from the end engaged inside the dip rod 4 towards the opposite end.

In the vicinity of its top end, the strut 1 includes a step 13 provided with a sealing ring 14 over which there slides an annular stepped control piston 15 of Z-shaped section. The top of the control piston 15 includes a sealing ring 16 which slides over the outside surface of the dip tube 4 and it co-operates therewith and with the strut to define a first control chamber 17. The bottom end of the control piston 15 includes a sealing ring 18 facing the inside surface of the strut 1 and co-operating therewith to delimit a second control chamber 19. The inside face 20 of the control piston 15 co-operates with the dip tube 4 to delimit a passage for the top end of the sliding rod 2 which can thus slide inside the strut 1 as far as a compression abutment 21 carried by the inside face of the control piston 15.

The bottom of the strut includes a stepped piston 22 having a shoulder 23 constituting an expansion abutment for the flange 7 on the sliding rod 2. In addition, the piston 22 co-operates with the inside surface of the strut 1 to delimit a chamber 24 for positioning the expansion abutment 23. The top of the piston 22 includes a position-marking tongue 25 and the bottom of the control piston 15 includes a position-marking tongue 26. The tongues 25 and 26 are detected when they come level with a proximity detector 27 fixed on the wall of the strut 1. The strut and the sliding rod are filled with shock-absorbing liquid.

At the top of the strut, the inside volume of the dip rod 4 is connected via a connection duct 28 to two accumulators 29 connected in parallel. Each of the accumulators includes a piston 30 slidably mounted inside the accumulator and having one face subjected to a gas under pressure 31 and another face subjected to the shock-absorbing liquid. A slide distributor valve 32 is mounted on one of the connection branches to one of the accumulators 29. The slide valve 32 includes a slide 33 having a segment of interconnection duct 34 and mounted to slide in a valve body 32 between a position where the segment of interconnection duct 34 coincides with the connection duct 28 and a position where the interconnection duct 34 is offset relative to the connection duct 28. Gas under pressure inserted in an annular return chamber 35 delimited by a shoulder 36 on the slide 33 urges the slide 33 towards the position where its segment of interconnection duct 34 coincides with the connection duct 28. The opposite face of the shoulder and the end of the slide constitute a control face delimiting a drive chamber 37 which is connected to the first control chamber 17 of the strut 1.

The second control chamber 19 of the strut 1 is connected to the chamber 24 for positioning the moving abutment 23 via an interconnection duct 38 having a controlled admission valve 39 mounted thereon. The second control chamber 19 is also connected in parallel to a source supplying control fluid 40 via a controlled valve 41. The positioning chamber 24 is connected to the exhaust from the source 40 for delivering control fluid via a duct 42 which includes a controlled exhaust valve 43 coupled to the controlled valve 41. The member for controlling the controlled valves 39 and 41 is connected firstly to the proximity detector 27 and secondly to an electrical control member (not shown).

The device of the invention operates as follows: in the position shown in FIG. 1, which is the road position for a vehicle adapted to run both on roads and on race tracks, the second control chamber 19 is filled with control fluid and the piston 15 is in abutment against an annular shoulder 44 on the inside surface of the strut 1. The position-marking tongue 26 is detected by the proximity detector 27. The controlled valves 39, 41, and 43 are closed. Under these conditions, the piston 15 is hydraulically locked in its bottom position such that the first control chamber 17 is at its maximum volume. The slide 33 is then in abutment to the right in the figure under the effect of the compressed gas in the chamber 35, and the interconnection duct segment 34 coincides with the connection duct 28. Both accumulators 29 are therefore in operation and the expansion abutment 23 is in its bottom position. In this position, the stiffness of the spring and shock absorber device is low and the throttling provided by the throttling rod 11 is likewise relatively low, thereby providing suspension which is relatively comfortable for driving on the road.

When it is desired to take up a position for driving on a race track, or a position for more sporty driving on the road assuming that the road surface is suitable, then the controlled valve 39 is opened, thereby establishing a hydraulic connection between the second control chamber 19 and the positioning chamber 24. Under the effect of the static load of the vehicle supported by the shock absorber, the piston 15 is thrust upwards and the control liquid flows from the control chamber 19 into the positioning chamber 24, thereby raising the piston 22 together with the expansion abutment 23. Simultaneously, the control liquid is expelled from the first control chamber 17 and thrusts the slide 33 to the left in the figure, thereby interrupting the hydraulic connection between the strut and one of the accumulators 29. When the position-marking tongue 25 is detected by the proximity detector 27, the controlled valve 39 is closed again. During upwards displacement of the piston 15, the volume released in the intermediate chamber 6 by said displacement is compensated by the sliding rod 2 retracting and by a corresponding displacement of the throttling rod 11. In this position which is shown in FIG. 2, the stiffness of the spring and shock absorber device is thus increased by one of the accumulators 29 being taken out of service, and throttling is also increased by virtue of the throttling rod 11 being displaced.

When it is desired to return to the road position, the controlled valves 41 and 43 are opened so that the control fluid is admitted into the second control chamber 19, thrusting the piston 15 downwards, while the positioning chamber 24 is connected to the exhaust and the piston 22 returns to the position shown in FIG. 1. When the position-marking tongue 26 is detected by the proximity detector 27, the controlled valves 41 and 43 are again closed, thereby locking the device in the position shown in FIG. 1.

Figure 3:
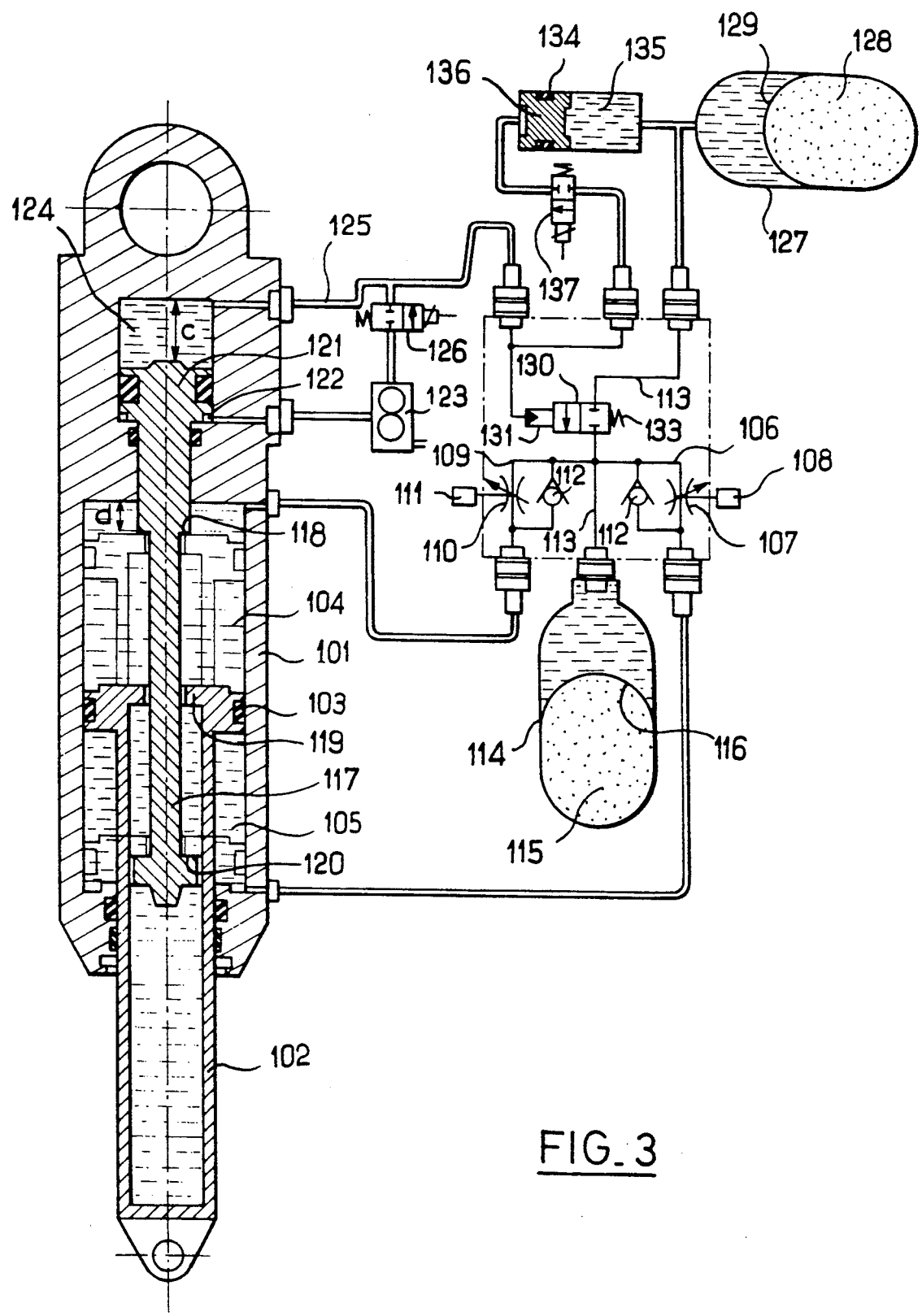
FIG. 3 is a diagrammatic view of a second embodiment of the spring and shock absorber device of the invention in its road position, with the shock absorber being shown in axial section.

With reference to FIG. 3, the spring and shock absorber device constituting a second embodiment of the invention comprises a strut or body 101 in which a sliding rod 102 is mounted to slide via a sealing ring 103. The sliding rod thus co-operates with the body 101 to delimit a compression shock-absorbing chamber 104 and an expansion shock-absorbing chamber 105. The shock absorbing chambers are connected to each other by throttling means carried by an auxiliary block in the embodiment shown. These throttling means comprise an expansion throttling circuit 106 including a throttling nozzle 107 of section which is adjustable, e.g. by means of a remotely-controlled electric motor 108. The throttling means also include a compression throttling circuit 109 also including an adjustable section throttling nozzle 110 and a control motor 111. The compression and expansion throttling circuits are isolated from each other by non-return valves 112.

The compression and expansion shock absorbing chambers are filled with hydraulic liquid and are connected via a connection duct 113 to a first accumulator 114 providing a spring function and including a compression gas chamber 115 which is separated from the hydraulic liquid by a membrane 116.

In the preferred embodiment as illustrated, the accumulator 114 is connected between the throttling circuits so as to be in direct connection with the compression shock-absorbing chamber 104 during expansion of the shock absorber, and via the compression throttling valve 110 during compression of the shock absorber.

A control rod 117 is disposed inside and coaxially with the body 101 and the sliding rod 102. the sliding rod 102 is hollow and the control rod 117 also extends inside the sliding rod 102. The sliding rod includes a top annular shoulder 118 projecting from the sliding rod and constituting a compression end-of-stroke abutment for the sliding rod. The compression end-of-stroke abutment 118 co-operates with an abutment member on the sliding rod constituted by an annular flange 119 formed at the top end of the sliding rod. The bottom end of the control rod includes an annular shoulder 120 projecting from the control rod and constituting an expansion end-of-stroke abutment for the sliding rod 102.

The control rod 117 is associated with a control piston 121 mounted to slide inside the body. The control piston 121 has a face connected to the control rod which co-operates with the walls of the bore in which it is slidably received to delimit a control rod retraction chamber 122 connected to a source of fluid under pressure 123. The opposite face of the piston delimits a control rod extension chamber 124. The extension chamber 124 is connected to the source of fluid under pressure 123 via a feed line including a line shut-off member such as an electrically-controlled valve 126.

The compression shock-absorbing chamber 104 is also connected to a second accumulator 127 connected in parallel with the first accumulator 114 and comprising a compressed gas chamber 128 separated from the hydraulic liquid by a membrane 129. The portion of the connection duct 113 providing the connection to the second accumulator 127 includes a distributor valve 130. The distributor valve 130 is normally urged by a resilient member 133 to a position in which communication with the accumulator 127 is shut off. The control input 131 opposite to the resilient member 133 is connected to the feed line 125 for the control rod extension chamber 124.

In the preferred embodiment as shown, the spring and shock absorber device of the invention includes a maximum lift member 134 comprising a supply of hydraulic liquid 135 connected to the compression shock-absorbing chamber and a piston 136 disposed in the supply 135 to urge the hydraulic liquid towards the compression shock-absorbing chamber. The face of the piston 136 facing away from the supply 135 is connected to the feed line 125 via a line shut-off member 137 such as an electrically-controlled valve.

In FIG. 3, the spring and shock absorber device is shown in its road position. In this position, the electrically controlled valve 126 is excited to ensure that a connection is provided between the source of fluid under pressure 123 and the feed line 125 such that the control rod extension chamber 124 is fed with control fluid. Because of the difference between the active area of the face of the piston facing the extension chamber 124 and the area of the face of the piston facing the retraction chamber 122, the piston 121 is thrust in the direction for extending the control rod 117. Simultaneously, the slide of the distributor valve 130 is thrust against its resilient member 133 and the valve 130 provides a connection between the compression shock-absorbing chamber 104 and both of the accumulators 114 and 127. In this position, the sliding rod 102 has a mean position as shown in FIG. 3, and during vehicle movement it may come into abutment against the compression end-of-stroke abutment 118 or the expansion end-of-stroke abutment 120 as shown in fine continuous lines in FIG. 3.

In this context, it may be observed that the expansion end-of-stroke abutment preferably coincides in the road position with the bottom end of the expansion shock-absorbing chamber 105 so that the sliding rod engages the expansion end-of-stroke abutment 120 of the control rod 117 as little as possible.

In this position, if an unusual obstacle is to be passed, the sliding rod may be extended from its mean position in order to lift the vehicle. This is done by exciting the electrically-controlled valve 137 so as to provide a connection with the feed line 125, thereby pushing back the piston 136 of the maximum lift member 134, thus having the effect of sending hydraulic liquid from the supply 135 into the compression shock-absorbing chamber 104.

Figure 4:
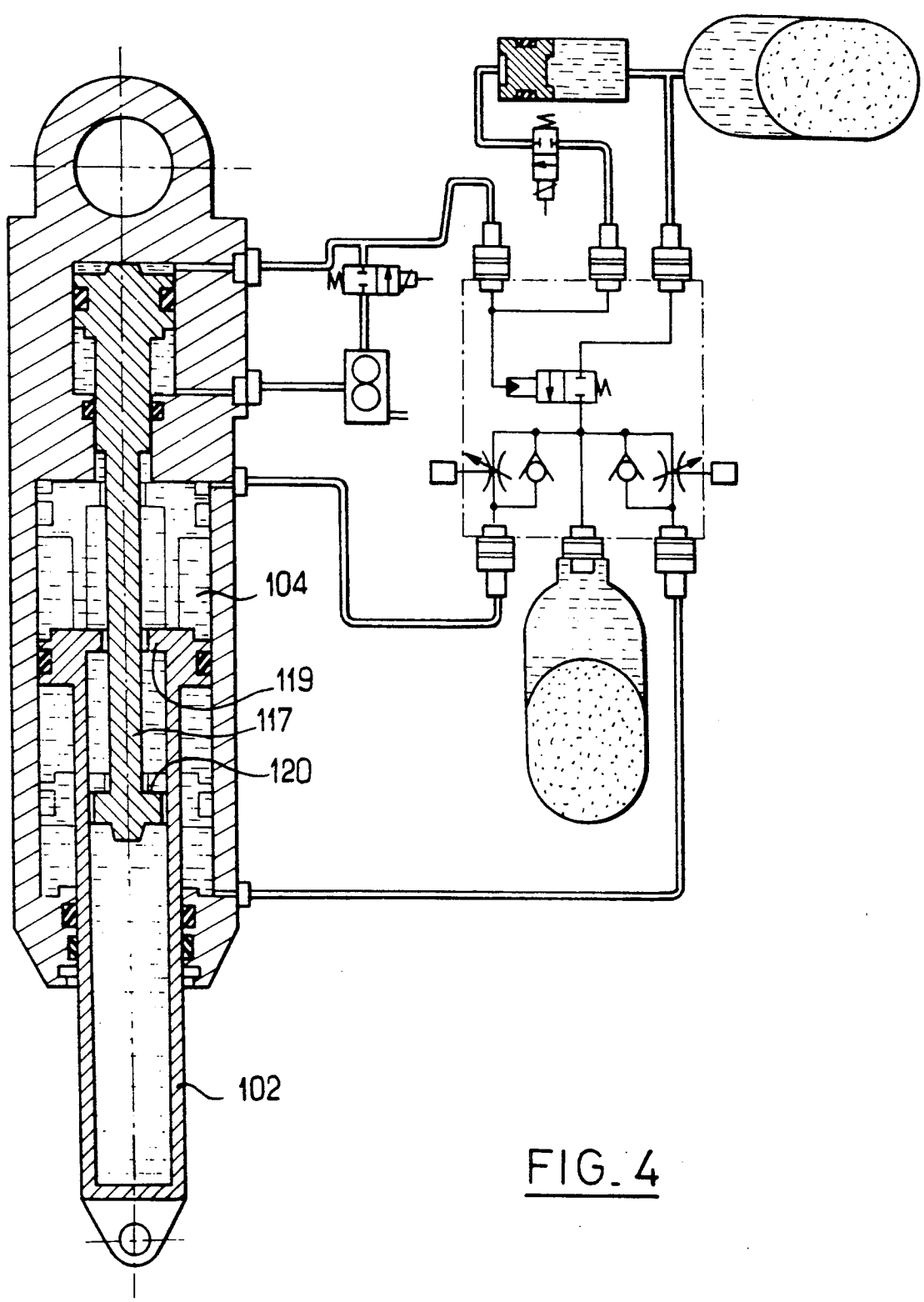
FIG. 4 is a view analogous to FIG. 3 showing the spring and shock absorber device in its racing track position.

When it is desired to take up a race track position which corresponds to the vehicle being in a lower position and to the spring and shock absorber device of the invention being stiffer, feed to the electrically controlled valve 126 is switched off so that the control rod extension chamber 124 is purged via a return line (not shown). Under the effect of the fluid pressure in the control rod retraction chamber 122, the piston 121 moves upwards bringing the control rod 117 up with it. In this context, it may be observed that the stroke c of the piston, and thus the stroke of the control rod is greater than the distance d between the compression end-of-stroke abutment 118 and the immediately adjacent end of the compression shock-absorbing chamber 104 when the control rod 117 is in its extended position (see FIG. 3). When the control rod 117 is in its retracted position as illustrated in FIG. 4, the compression end-of-stroke abutment 118 of the control rod is thus retracted relative to the adjacent end of the compression shock-absorbing chamber 104 such that the compression end-of-stroke abutment for the sliding rod 102 is now provided by the end of the compression shock-absorbing chamber 104. Simultaneously, the expansion end-of-stroke abutment 120 is raised by a distance equal to the stroke of the piston 121 such that the stroke of the sliding rod 102 is less than the stroke that it has available to it in the road position. Simultaneously, the volume released by retracting the wide top portion of the control rod is compensated by retracting the mean position of the sliding rod 102. Finally, the valve 130 is pushed back by the resilient member 133 so that only the first accumulator 114 is in operation, thereby ensuring stiffer operation of the spring and shock absorber device.

Naturally the invention is not limited to the embodiments described and variants may be applied thereto without going beyond the scope of the invention. In particular, in the first embodiment, although throttling members are provided inside the strut 1, equivalent throttling members could be disposed on the connection duct 28 at a point between the accumulators 29 and the strut 1.

Similarly, although the shock absorbers 29 are shown as having a separator piston 30 disposed between the shock-absorbing liquid and the gas under pressure 31 for the purpose of keeping the liquid and the gas apart regardless of the position of the accumulator relative to the vehicle, it would also be possible to provide accumulators that do not include separating walls, in which case the accumulators must necessarily be disposed vertically so that the gas under pressure remains above the shock-absorbing liquid.

Although the control rod 117 in the second embodiment shown is disposed axially and extends inside the sliding rod 102, it would also be possible to provide a tubular control rod extending along the walls of the shock-absorbing chambers outside the sliding rod 102.

Similarly, although the compression and expansion throttling means shown are constituted by an auxiliary block, thus making it possible to adjust the degree of throttling provided, it would also be possible to provide throttling means on the sliding rod.

It would also be possible to replace the single source of fluid under pressure 123 by a plurality of sources of fluid under pressure put into operation separately for feeding the corresponding members under the desired operating conditions.

We claim:

1. A spring and shock absorber device comprising a strut, a sliding rod mounted to slide inside the strut and to cooperate therewith to delimit a compression shock-absorbing chamber and an expansion shock-absorbing chamber both containing a shock-absorbing liquid and interconnected by throttle means, the compression shock-absorbing chamber being connected by a connection duct to at least one accumulator containing a gas under pressure, and a control piston for displacing a control rod between positions which are retracted or extended relative to the strut, wherein the control piston is associated with the control rod which is coaxial with the sliding rod and which includes a compression end-of-stroke abutment and an expansion end-of-stroke abutment, and a stroke c of the control rod is greater than a distance d between the compression end-of-stroke abutment and an immediately adjacent end of the compression shock-absorbing chamber when the control rod is in an extended position.

2. A spring and shock absorber device according to claim 1, wherein the control piston has one face connected to the control rod associated with a retraction chamber for the control rod constantly connected to a source of fluid under pressure, and an opposite face associated with an extension chamber for the control rod connected to the same source of fluid under pressure via a feed line including a line cut-off member.

3. A spring and shock absorber device according to claim 2, wherein the compression shock-absorbing chamber is connected to two accumulators, and wherein the connection duct includes means for isolating one of the accumulators from the compression shock-absorbing chamber.

4. A spring and shock absorber device according to claim 3, wherein the means for isolating one of the accumulators from the compression shock-absorbing chamber comprise a distributor valve controlled by the feed line to the control rod extension chamber.

5. A spring and shock absorber device according to claim 2, including a maximum lift member including a supply of hydraulic liquid connected to the compression shock-absorbing chamber and a piston disposed inside the supply to thrust the hydraulic liquid towards the compression shock-absorbing chamber.

6. A spring and shock absorber device according to claim 5, wherein the piston of the maximum lift device is controlled by the feed line to the control rod extension chamber by means of a line cut-off member.

* * * * *